Patented Oct. 24, 1950

2,527,259

UNITED STATES PATENT OFFICE 2,527,259

CYANINE DYESTUFFS

John David Kendall, Henry Walter Wood, and John Raymond Majer, Ilford, England, assignors to Ilford Limited, Ilford, England, a British company No Drawing. Application October 8, 1942, Serial No. 461,324. In Great Britain November 6, 1941

10 Claims. (Cl. 260—240.4)

This invention relates to dyestuffs and particularly to the production of dyestuffs capable of sensitising gelatino silver halide photographic emulsions.

In our co-pending application Serial No. 461,322 filed on even date herewith now Patent 2,372,960 April 3, 1945, there is described the production of new dyestuff intermediates by the reaction of a compound of the general Formula I:

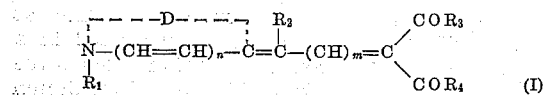

(where D is the residue of a heterocyclic nitrogen nucleus, $R_1$ is an alkyl, hydroxy alkyl or aralkyl group, $R_2$ is a hydrogen atom or an alkyl or aralkyl group, $R_3$ and $R_4$ are hydrocarbon groups, e. g. alkyl, aryl or aralkyl groups, $n$ is nought or 1 and $m$ is 1, 3 or 5) with an alkyl- or aralkyl-mercaptan in the presence of a strong acid or an alkyl salt of a strong acid. Preferably, in this process the reaction conditions are kept as dry as possible, so that a very convenient acid is dry hydrochloric acid gas.

The general formula of the new intermediates is believed to be:

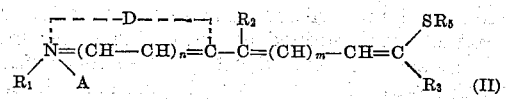

($R_5$ is an alkyl or aralkyl group, A is an acid radicle and the other symbols have the meaning assigned to them above).

The groups $R_1$, $R_2$, $R_3$, $R_4$ and $R_5$ may variously be hydrogen atoms, alkyl groups, aryl groups and aralkyl groups as above defined. $R_1$ is preferably a lower alkyl group, i. e. a methyl, ethyl, propyl or butyl group or, if an aralkyl group, is preferably a benzyl group. The group $R_2$ may be a hydrogen atom but if not, is preferably a lower alkyl group as defined above. It may, however, be a higher alkyl group or an aralkyl group such as benzyl. $R_3$ and $R_4$ again are preferably lower alkyl groups though they may be higher alkyl groups or aralkyl groups as in the case of the group $R_2$, or they may be aryl groups. The group $R_5$ is preferably a lower alkyl group though it may be a higher alkyl group or an aralkyl group as in the case of the group $R_2$. Any of the aforesaid alkyl, aryl or aralkyl groups may themselves contain substituent groups, e. g. hydroxy or amino groups.

According to the present invention, dyestuffs are obtained by reacting a dyestuff intermediate of general Formula II (obtainable by the general process defined in our co-pending application Serial No. 461,322) with a cyclic compound containing a reactive methylene ( >$CH_2$) group. Examples of such compounds are as follows:

(a) a five-membered ring compound containing the system:

where D is the residue of a heterocyclic nitrogen-keto-methylene ring and R is a hydrogen atom or a hydrocarbon group.

(b) a quaternary salt of a heterocyclic nitrogen compound having a reactive methyl group, monosubstituted methyl group or external methylene group in the $\alpha$ or $\gamma$ position to a heterocyclic nitrogen atom.

(c) Carbocyclic compounds containing a keto-methylene group.

The foregoing compounds $a$, $b$ and $c$ are characterised by the fact that they all contain a reactive $CH_2$ group either as an external substituent or in a ring system where it is activated by an adjacent keto group. (A reactive methyl group, which may be written as —$CH_2$—H, includes a reactive methylene group.)

According to a further feature of the invention, when the five membered ring compound of type $a$ containing the system

which is condensed with the said dyestuff intermediate, corresponds to the general formula:

(R being a hydrogen atom or a hydrocarbon group and X being an oxygen atom or a sulphur atom) the resulting product contains a thione grouping and so may be treated with an alkyl or aralkyl salt and condensed with any of the compounds $a$, $b$ and $c$ enumerated above, i. e. the process of the invention may be repeated to add a further group to the product.

When this second condensation is with a five-membered ring compound containing the system:

which also corresponds to the general formula:

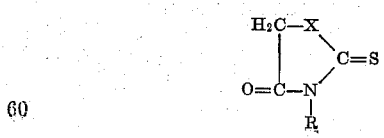

(R being a hydrogen atom or a hydrocarbon group and X being an oxygen atom or a sulphur atom), the product will once more contain a thione grouping, and by proceeding in this way the condensation may be repeated as often as desired; the final product obtained by any such series of condensations may be further condensed according to the invention with any of the other types of compound b or c above to give a dyestuff comprising two nuclear groups, for example, heterocyclic nitrogen nuclei, linked by a chain of any desired number of keto-thiazoline or keto-oxazoline rings, which chain may also include other rings according to the condensations carried out.

Examples of compounds of type a which may be condensed with the said dyestuff intermediate according to this invention are rhodanic acid (2-thio-4-keto-tetrahydrothiazole), oxarhodanic acid (2-thio-4-keto-tetrahydrooxazole), and the N-hydrocarbon derivatives of such compounds and the compounds enumerated in the specification of British Patent No. 426,718, filed October 3, 1933, namely oxindoles, pyrazole-5-ones, hydantoin, thio-hydantoin, $\psi$-hydantoin and $\psi$-thiohydantoin.

Compounds of type b which may be employed may be any of those which have been used or proposed for use in the many processes for the production of cyanine and similar dyestuffs, for example, thiazoles, oxazoles, selenazoles and their polycyclic homologues such as those of the benzene, naphthalene, acenaphthene and anthracene series; pyridine and its polycyclic homologues such as quinoline and $\alpha$ and $\beta$ naphthaquinolines lepidines; indolenines; diazines; such as pyrimidines and quinazolines; diazoles (e. g. thio-$\beta\beta'$-diazole); oxazolines, thiazolines and selenazolines. The polycyclic compounds of these series may also be substituted in the carbocyclic rings with one or more groups such as alkyl, aryl, amino, hydroxy, alkoxy and methylene-dioxy groups, or by halogen atoms.

Examples of compounds of type c which may be employed are 1.3-indane-dione and the hydrindones.

Where heterocyclic nitrogen nuclei are referred to in this specification they may be any of those which have been used or proposed for use in the many processes for the production of cyanine and similar dyestuffs, for example, those listed above in connection with compounds of type b.

The formation of the dyestuffs is readily effected by heating the reagents together in the presence of a solvent and a base, e. g. pyridine, piperidine, diethylamine, triethylamine and triethanolamine, or an inorganic base such as a solution of sodium or sodium acetate in ethyl alcohol.

Where reaction is effected with a quaternary salt of type b above, the quaternary salt may be formed in situ by heating together with the compounds of general formula II the corresponding heterocyclic base and sufficient of an alkyl or aralkyl ester, e. g. an alkyl or aralkyl-p-toluene sulphonate, to convert said base to the quaternary salt.

Where the dyestuff is obtained in the form of a sulphate or an alkyl-p-toluene sulphonate, it may be converted to a salt of another acid by treatment with a solution of an alkali salt of such other acid, e. g. potassium chloride, potassium bromide, potassium iodide and potassium perchlorate.

The following examples illustrate the invention:

Example 1

Preparation of the dyestuff of the probable formula:

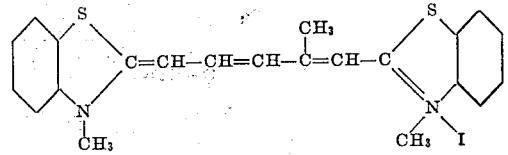

1.5 gms. of 1-($\omega$-methyl-$\omega$-ethylthio-butadienyl) benzthiazole methochloride, i. e. the dyestuff intermediate obtained according to Example 1 of our co-pending application Serial No. 461,322 filed on even date herewith, and 1.45 gms. of 1-methyl-benzthiazole methiodide were dissolved in 20 ccs. of ethyl alcohol and boiled. 1 gm. of sodium acetate was added and the mixture boiled for 20 minutes. On cooling, the dyestuff separated as bright grass-green crystals. These were separated by filtration and recrystallised from methyl alcohol solution, the final product being obtained as bright green crystals melting at 234° C. This dyestuff when incorporated in a gelatino silver iodobromide emulsion extends the sensitivity to about 8800Å with a broad maximum at about 7000Å to 7600Å.

Example 2

Preparation of the dyestuff of the probable formula:

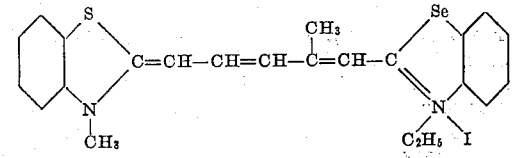

The procedure of Example 1 was followed using 2.0 gms. of 1-methyl-benzselenazole ethiodide instead of 1-methyl-benzthiazole methiodide. The product was obtained as light blue flakes melting at 205° C. This dyestuff when incorporated in a gelatino silver iodobromide emulsion imparts a band of sensitivity extending from about 6000Å to 7800Å with a maximum at about 7100Å.

Example 3

Preparation of the dyestuff of the probable formula:

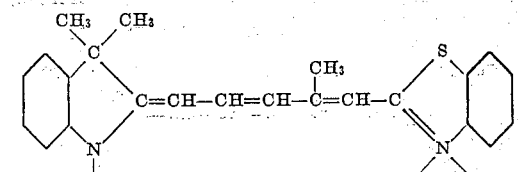

3.0 gms. of 2-($\omega$-methyl-$\omega$-ethylthio-butadienyl-) 1.3.3-trimethyl indolenine chloride, i. e. the dyestuff intermediate obtained according to Example 2 of our co-pending application Serial No. 461,322 filed on even date herewith, was dissolved in 25 ccs. of ethyl alcohol and 4 gms. of finely divided 1-methyl-benzthiazole methiodide was added. 2 ccs. of triethylamine were then added and the solution shaken. Reaction set in immediately and after gently refluxing for 20 minutes, the liquid was allowed to cool. The desired dyestuff separated out and was removed by filtration. On recrystallisation from methyl alcohol solution the dyestuff was obtained as lustrous green crystals melting at 228° C. This dyestuff when incorporated in a gelatin silver iodobromide emulsion imparts a band of sensitivity extending from about 6000Å to about 8400Å with maxima at about 7200Å and about 7700Å.

*Example 4*

Preparation of the dyestuff of the probable formula:

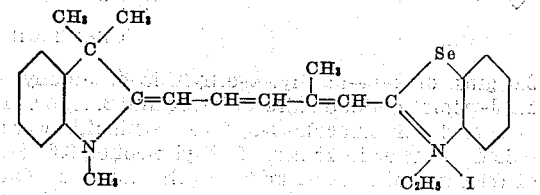

2.5 gms. of 2-(ω-methyl-ω-ethylthio-butadienyl)-1.3.3-trimethyl indolenine chloride and 4 gms. of 1-methyl-benzselenazole ethiodide were dissolved in 20 ccs. of ethyl alcohol. 2.5 ccs. of triethylamine were added and the solution warmed for half an hour. The solution was then diluted with aqueous potassium iodide solution whereupon the desired dyestuff separated as green crystals. On recrystallisation from methyl alcohol solution the dyestuff was ob- This dyestuff when incorporated in a gelatino silver iodobromide emulsion imparts a band of ver iodobromide emulsion imparts a band of sensitivity extending to about 7800Å with maximum at about 7300Å.

*Example 5*

Preparation of the dyestuff of the probable formula:

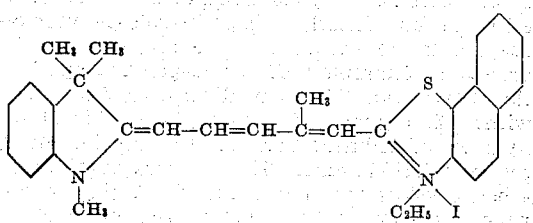

1 gm. of 1-methyl-5.6-naphthathiazole ethiodide and 0.6 gm. of 2-(ω-methyl-ω-ethylthio-butadienyl)-1.3.3-trimethyl indolenine chloride were dissolved in 30 ccs. of dry ethyl alcohol and 1 cc. of triethylamine was added. The mixture was heated for 20 minutes during which a blue colour developed and the dyestuff separated from solution. It was removed by filtration and after boiling out with methyl alcohol was obtained as green crystals melting at 217° C. This dyestuff when incorporated in a gelatino silver iodobromide emulsion imparts a band of sensitivity extending to about 8000Å with a maximum at about 7400Å.

*Example 6*

Preparation of the dyestuff of the probable formula:

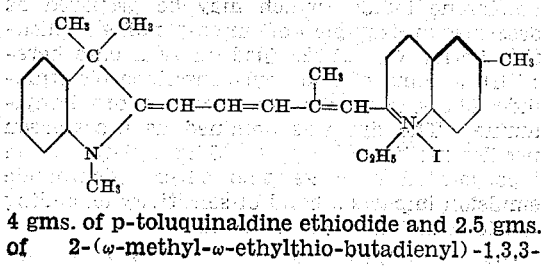

4 gms. of p-toluquinaldine ethiodide and 2.5 gms. of 2-(ω-methyl-ω-ethylthio-butadienyl)-1.3.3- trimethyl indolenine chloride were dissolved in 25 ccs. of dry ethyl alcohol and 5 ccs. of triethylamine were added. The mixture was heated for 25 minutes whereupon a blue colour developed. The solution was then diluted with 250 ccs. of water whereupon a tarry material separated which partially hardened to green crystals. This material was separated by filtration and washed with hot benzene. On recrystallisation from methyl alcohol solution the dyestuff was obtained as bronze crystals melting at 160–170° C. This dyestuff when incorporated in a gelatino silver iodobromide emulsion imparts a band of sensitivity extending from 5600Å to 7800Å with a shallow maximum at about 7000Å–7200Å.

*Example 7*

Preparation of the dyestuff of the probable formula:

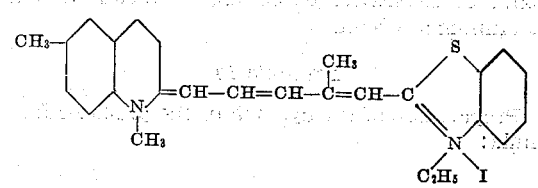

1.5 gms. of 2-(ω-methyl-ω-ethylthio-butadienyl)-6-methyl quinoline methochloride, i. e., the dyestuff intermediate obtained according to Example 3 of our co-pending application Serial No. 461,322 filed on even date herewith, and 1.5 gms. 1-methylbenzthiazole ethiodide were dissolved in 25 ccs. of ethyl alcohol and 1 gm. of sodium acetate was added. The solution was boiled for about 40 minutes whereupon the desired dyestuff separated from solution. It was removed by filtration, washed and dried. It consisted of bright green crystals which after recrystallisation melted at 230° C. This dyestuff, when incorporated in a gelatino silver iodobromide emulsion imparts a band of sensitivity which extends to 8000Å with a maximum at 7500Å.

*Example 8*

Preparation of the dyestuff of the probable formula:

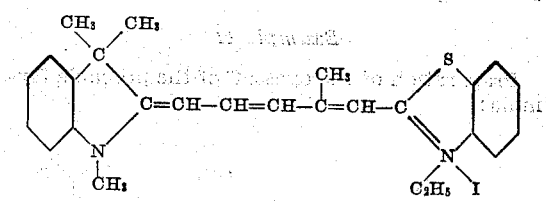

2.1 gms. of 2-(ω-methyl-ω-ethylthio-butadienyl)-1.3.3-trimethyl indolenine iodide i. e. the intermediate prepared according to Example 4 of our co-pending application Serial No. 461,322 filed on even date herewith, and 2.3 gms. of 1-methyl benzthiazole ethiodide were dissolved in 25 ccs. spirit and the mixture boiled. 1 gm. of fused sodium acetate was then added and the mixture heated for 25 minutes. On cooling, a tarry product separated and this was dissolved in acetone and treated with ether when the dyestuff precipitated out. On recrystallisation from methyl alcohol it was obtained as shining green crystals melting at 220° C. This dyestuff when incorporated in a gelatino silver iodobromide emulsion imparts a band of sensitivity with a maximum at 7000Å,

Example 9

Preparation of the dyestuff of the probable formula:

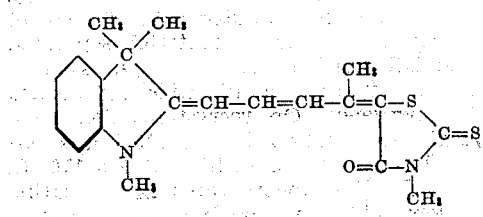

The preparation was effected as in Example 8 using 1 gm. of N-methyl rhodanic acid instead of the 1-methyl benzthiazole ethiodide. The product was obtained as a dark purple solid melting at 235° C. This dyestuff when incorporated in a gelatino silver iodobromide emulsion imparts a band of sensitivity extending to 7300Å with a maximum at 6900Å.

Example 10

Preparation of the dyestuff of the probable formula:

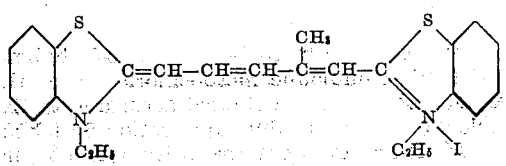

1.8 gms. of 1(ω-methyl-ω-ethylthio-butadienyl) benzthiazole ethochloride (which may be prepared as in Example 1 of our co-pending application Serial No. 461,322 filed on even date herewith) were mixed with 1.5 gms. of 1-methyl-benzthiazole ethiodide and dissolved in 15 ccs. of ethyl alcohol. The solution was boiled, 1.2 ccs. of triethylamine was added and the solution then boiled for 20 minutes. The dyestuff crystallised out from solution and after recrystallisation from methyl alcohol solution was obtained as shining grass-green crystals melting at 229° C. This dyestuff when incorporated in a gelatino silver iodobromide emulsion imparts a band of sensitivity extending to 7900Å.

Example 11

Preparation of the dyestuff of the probable formula:

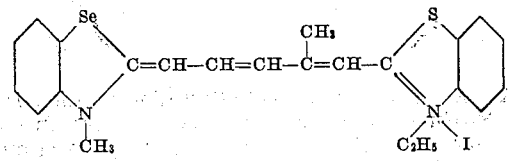

1.8 gms. of 1(ω-methyl-ω-ethylthio-butadienyl) benzselenazole methochloride (which may be prepared as in Example 5 of our co-pending application Serial No. 461,322 filed on even date herewith) and 1.5 gms. of 1-methyl-benzthiazole ethiodide were reacted as in Example 10. The dye was obtained in the form of light green crystals melting at 224° C. This dyestuff when incorporated in a gelatino silver iodobromide emulsion imparts a band of sensitivity extending to 8000Å with a maximum at 7300Å.

Example 12

Preparation of the dyestuff of the probable formula:

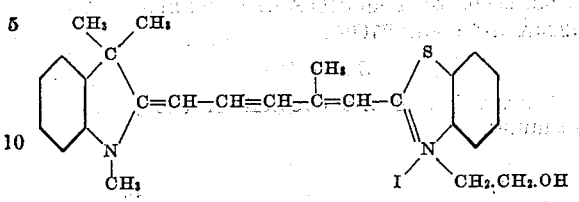

3.0 gms. of 2-(ω-methyl-ω-ethylthio-butadienyl) 1.3.3-trimethyl indolenine chloride and 3.2 gms. of 1-methyl benzthiazole-β-hydroxy ethiodide were boiled together in 15 ccs. of ethyl alcohol, 3.5 ccs. of triethylamine being added to the mixture. On cooling and diluting, the product separated and after recrystallisation from methyl alcohol was obtained as green crystals, melting at 228° C. This dyestuff when incorporated in a gelatino silver iodobromide emulsion imparts a band of sensitivity extending to 8000Å with a maximum at 7050Å.

Example 13

Preparation of the dyestuff of the probable formula:

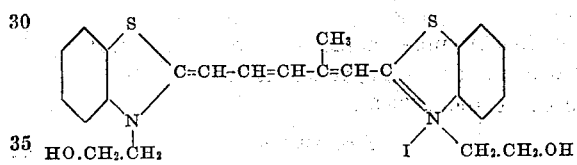

This dye was prepared by a process similar to that of Example 12 using 3.06 gms. of 1-(ω-methyl-ω-ethylthio-butadienyl) benzthiazole-β-hydroxy-ethyl chloride (which may be prepared by the process of Example 6 of our co-pending application Serial No. 461,322 filed on even date herewith), 3.21 gms. of 1-methyl-benzthiazole-β-hydroxy-ethiodide, 20 ccs. of ethyl alcohol and 2 ccs. of triethylamine. The dye was obtained as green crystals melting at 226° C. This dyestuff when incorporated in a gelatino silver iodobromide emulsion imparts a band of sensitivity extending to 8400Å with a maximum at 7200Å.

Example 14

Preparation of the dyestuff of the probable formula:

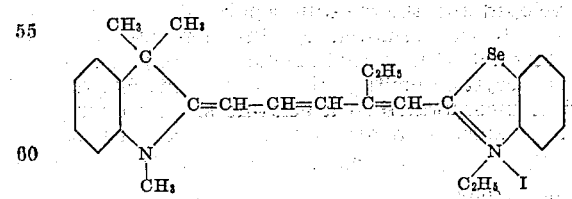

This dye was prepared by a method similar to that described in Example 12 using 4.2 gms. of 2-(ω-ethyl-ω-ethylthio-butadienyl) 1.3.3-trimethyl indolenine iodide (which may be prepared as described in Example 7 of our co-pending application Serial No. 461,322 filed on even date herewith), 3.6 gms. of 1-methyl-benzselenazole ethiodide, 20 ccs. of ethyl alcohol and 1 cc. of triethylamine. The dye was obtained as grass-green needles melting at 192° C. This dyestuff when incorporated in a gelatino silver iodobromide emulsion imparts a band of sensitivity extending to 8600Å with a maximum at 7100Å.

Example 15

Preparation of the dyestuff of the probable formula:

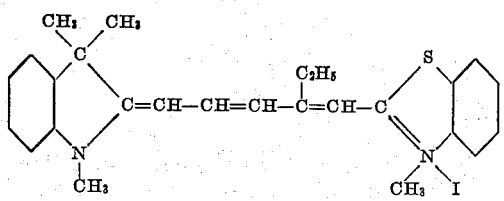

This dye was prepared by a method similar to that of Example 14 using 2.95 gms. of 1-methyl-benzthiazole methiodide instead of the benzselenazole compound. The dye was obtained as tiny green crystals melting at 225° C. This dyestuff when incorporated in a gelatino silver iodobromide emulsion imparts a band of sensitivity extending to 7800Å with a maximum at 7000Å.

The corresponding ethiodide salt was prepared by using 3.0 gms. of 1-methyl-benzthiazole ethiodide in a similar process, and consisted of green crystals melting at 213° C. This dyestuff when incorporated in a gelatino silver iodobromide emulsion imparts a band of sensivity extending to 8800Å with a maximum at 7200Å.

Example 16

Preparation of the dyestuff of the probable formula:

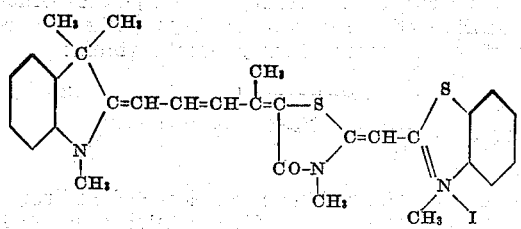

0.4 gm. of the dyestuff prepared according to Example 9 was mixed with 0.35 gm. of 1-methylbenzthiazole and 3.0 gms. of methyl-p-toluene sulphonate. The mixture was fused for three hours at 140° C. 20 ccs. of pyridine were added to the mixture and the mixture boiled for half an hour. The mixture was then poured into aqueous potassium iodide solution whereupon the dyestuff crystallised out. On recrystallisation from methyl alcohol solution it was obtained as bronze crystals melting at 273° C.

Example 17

Preparation of the dyestuff of the probable formula:

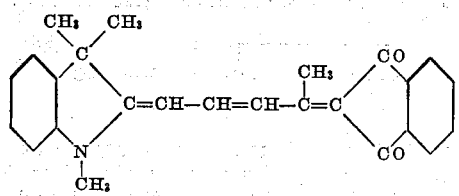

2.1 gms. of 1.3-indane-dione and 6.0 gms. of 2-($\omega$-methyl-$\omega$-ethylthio-butadienyl) - 1.3.3 - trimethyl indolenine iodide were dissolved in 20 ccs. of ethyl alcohol and boiled. 2.5 ccs. of triethylamine were added and the mixture boiled for a further quarter of an hour. The mixture was then poured into water whereupon the product separated. After extraction with ethyl acetate the dyestuff was obtained as a purple solid melting at 163° C.

Whilst in the foregoing examples the sensitising data is given in respect of silver iodobromide emulsions, the dyes of this invention may be usefully employed in other types of photographic emulsion, e. g. silver chloride, silver bromide and silver chlorobromide emulsions.

What we claim is:

1. Process for the production of dyestuffs which comprises condensing by heating together a dyestuff intermediate of the general formula:

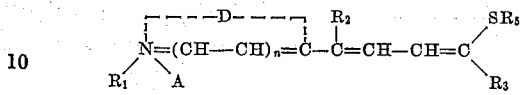

where D is the residue of a heterocyclic nitrogen nucleus of the type used in cyanine dyes, $R_1$ is selected from the class consisting of alkyl, hydroxy alkyl and aralkyl groups, $R_2$ is selected from the class consisting of the hydrogen atom and alkyl and aralkyl groups, $R_3$ is a hydrocarbon group, $R_5$ is selected from the class consisting of alkyl and aralkyl groups, A is an acid residue, and $n$ is selected from the class consisting of nought and 1, with an alkyl quaternary salt of a heterocyclic nitrogen compound of the type used in cyanine dyes containing a lower alkyl group in one of the $\alpha$ and $\gamma$ positions to the quaternary heterocyclic nitrogen atom.

2. Process for the production of dyestuffs which comprises condensing by heating together a dyestuff intermediate of the general formula:

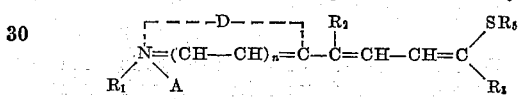

where D is the residue of a heterocyclic nitrogen nucleus of the type used in cyanine dyes, $R_1$ is selected from the class consisting of alkyl, hydroxy alkyl and aralkyl groups, $R_2$ is selected from the class consisting of the hydrogen atom and alkyl and aralkyl groups, $R_3$ is a hydrocarbon group, $R_5$ is selected from the class consisting of alkyl and aralkyl groups, A is an acid residue, and $n$ is selected from the class consisting of nought and 1, with a heterocyclic nitrogen keto-methylene compound of the general formula:

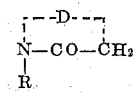

where D is the residue of a heterocyclic nitrogen keto-methylene nucleus, and R is selected from the class consisting of the hydrogen atom and hydrocarbon groups.

3. Process for the production of dyestuffs which comprises condensing by heating together a dyestuff intermediate of the general formula:

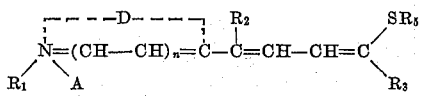

where D is the residue of a heterocyclic nitrogen nucleus of the type used in cyanine dyes, $R_1$ is selected from the class consisting of alkyl, hydroxy alkyl and aralkyl groups, $R_2$ is selected from the class consisting of the hydrogen atom and alkyl and aralkyl groups, $R_3$ is a hydrocarbon group, $R_5$ is selected from the class consisting of alkyl and aralkyl groups, A is an acid residue, and $n$ is selected from the class consisting of nought and 1, with a compound of the general formula:

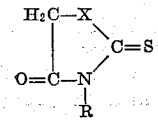

where X is selected from the group consisting of oxygen and sulphur and R is selected from the group consisting of the hydrogen atom and hydrocarbon groups.

4. Process for the production of dyestuffs which comprises condensing by heating together a dyestuff intermediate of the general formula:

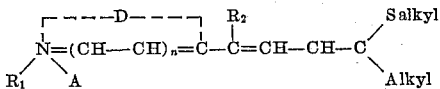

where D is the residue of a heterocyclic nitrogen nucleus of the type used in cyanine dyes, $R_1$ is selected from the class consisting of alkyl, hydroxy alkyl and aralkyl groups, $R_2$ is selected from the class consisting of the hydrogen atom and alkyl and aralkyl groups, A is an acid residue and $n$ is selected from the class consisting of nought and 1, with a quaternary salt of a heterocyclic nitrogen compound of the type used in cyanine dyes containing a reactive methylene group in one of the $\alpha$ and $\gamma$ positions to the quaternary heterocyclic nitrogen atom.

5. Process for the production of dyestuffs which comprises condensing by heating together a dyestuff intermediate of the general formula:

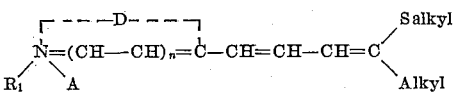

where D is the residue of a heterocyclic nitrogen nucleus of the type used in cyanine dyes, $R_1$ is selected from the class consisting of alkyl, hydroxy alkyl and aralkyl groups, A is an acid residue and $n$ is selected from the class consisting of nought and 1, with an alkyl quaternary salt of a heterocyclic nitrogen compound of the type used in cyanine dyes containing a lower alkyl group in one of the $\alpha$ and $\gamma$ positions to the quaternary heterocyclic nitrogen atom.

6. Process for the production of dyestuffs which comprises condensing by heating together a dyestuff intermediate of the general formula:

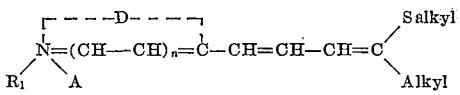

where D is the residue of a heterocyclic nitrogen nucleus of the type used in cyanine dyes, $R_1$ is selected from the class consisting of alkyl, hydroxy alkyl and aralkyl groups, A is an acid residue and $n$ is selected from the class consisting of nought and 1, with a heterocyclic nitrogen keto-methylene compound of the general formula:

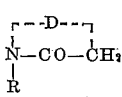

where D is the residue of a heterocyclic nitrogen keto-methylene nucleus, and R is selected from the class consisting of the hydrogen atom and hydrocarbon groups.

7. Process for the production of dyestuffs which comprises condensing by heating together a dyestuff intermediate of the general formula:

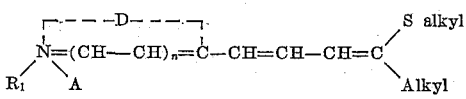

where D is the residue of a heterocyclic nitrogen nucleus of the type used in cyanine dyes, $R_1$ is selected from the class consisting of alkyl, hydroxy alkyl and aralkyl groups, A is an acid residue and $n$ is selected from the class consisting of nought and 1, with a compound of the general formula:

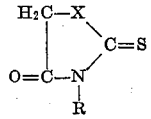

where X is selected from the class consisting of oxygen and sulphur and R is selected from the class consisting of the hydrogen atom and hydrocarbon groups.

8. Process according to claim 7 wherein the product obtained is treated with a salt selected from the class consisting of alkyl and aralkyl salts and the quaternary salt thereby obtained is further reacted with a compound of the general formula:

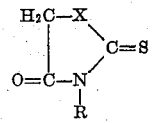

where X is selected from the class consisting of oxygen and sulphur and R is selected from the class consisting of the hydrogen atom and hydrocarbon groups.

9. Process for the production of dyestuffs which comprises condensing by heating together a dyestuff intermediate of the general formula:

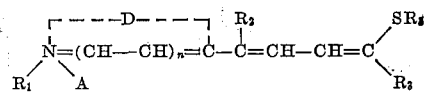

where D is the residue of a heterocyclic nitrogen nucleus of the type used in cyanine dyes, $R_1$ is selected from the class consisting of alkyl, hydroxy alkyl and aralkyl groups, $R_2$ is selected from the class consisting of the hydrogen atom and alkyl and aralkyl groups, $R_3$ is a hydrocarbon group, $R_5$ is selected from the class consisting of alkyl and aralkyl groups, A is an acid residue, $n$ is selected from the class consisting of nought and 1, with a quaternary salt of a heterocyclic nitrogen compound of the type used in cyanine dyes containing a reactive methylene group in one of the alpha and gamma positions to the quaternary heterocylic nitrogen atom.

10. Process for the production of dyestuffs which comprises condensing by heating together a dyestuff intermediate of the general formula:

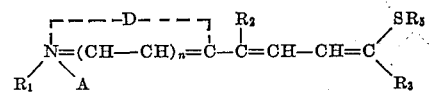

where D is the residue of a heterocyclic ntrogen nucleus of the type used in cyanine dyes, $R_1$ is selected from the class consisting of alkyl, hydroxyl alkyl and aralkyl groups, $R_2$ is selected from the class consisting of the hydrogen atom and alkyl and aralkyl groups, $R_3$ is a hydrocarbon group, $R_5$ is selected from the class consisting of alkyl and aralkyl groups, A is an acid residue, $n$ is selected from the class consisting of nought and 1, with a compound containing a reactive methylene group taken from the class consisting of five-membered heterocyclic nitrogen keto-methylene compounds, quaternary salts of heterocyclic nitrogen compounds having in one of the positions alpha and gamma to the heterocyclic nitrogen atom a reactive group taken from the class consisting of methyl and mono-substituted methyl groups.

JOHN DAVID KENDALL.
HENRY WALTER WOOD.
JOHN RAYMOND MAJER.

REFERENCES CITED

The following references are of record in the file of this patent:

UNITED STATES PATENTS

| Number | Name | Date |
|---|---|---|
| 1,846,300 | Brooker | Feb. 23, 1932 |
| 2,071,899 | Peggot | Feb. 23, 1937 |
| 2,078,233 | Brooker | Apr. 27, 1937 |
| 2,104,064 | Zeh | Jan. 4, 1938 |
| 2,107,379 | Koslowsky | Feb. 8, 1938 |
| 2,131,865 | Zeh | Oct. 4, 1938 |
| 2,269,234 | Sprague | Jan. 6, 1942 |

FOREIGN PATENTS

| Number | Country | Date |
|---|---|---|
| 355,693 | Great Britain | 1931 |

Certificate of Correction

October 24, 1950

Patent No. 2,527,259

JOHN DAVID KENDALL ET AL.

It is hereby certified that error appears in the printed specification of the above numbered patent requiring correction as follows:

Column 5, line 27, for "ob-" read *obtained as dark green crystals melting at 180° C.*; line 30, strike out "ver iodobromide emulsion imparts a band of"; and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*